United States Patent
Ahn et al.

(10) Patent No.: US 9,595,121 B2
(45) Date of Patent: Mar. 14, 2017

(54) SYSTEMS AND METHODS FOR PET PENALIZED-LIKELIHOOD IMAGE RECONSTRUCTION WITH SPATIALLY VARYING SMOOTHING PARAMETERS

(71) Applicant: General Electric Company, Schenectady, NY (US)

(72) Inventors: Sangtae Ahn, Niskayuna, NY (US); Evren Asma, Niskayuna, NY (US); Ravindra Manjeshwar, Niskayuna, NY (US); Steven Ross, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 485 days.

(21) Appl. No.: 13/667,737

(22) Filed: Nov. 2, 2012

(65) Prior Publication Data

US 2014/0126793 A1    May 8, 2014

(51) Int. Cl.
  *G06K 9/00*    (2006.01)
  *G06T 11/00*    (2006.01)

(52) U.S. Cl.
  CPC ....... *G06T 11/006* (2013.01); *G06T 2211/424* (2013.01)

(58) Field of Classification Search
  CPC ................. G06T 5/002; G06T 2200/04; G06T 2207/30004
  See application file for complete search history.

(56) References Cited

U.S. PATENT DOCUMENTS

| | | | |
|---|---|---|---|
| 6,754,298 B2 | 6/2004 | Fessler | |
| 7,885,371 B2 | 2/2011 | Thibault et al. | |
| 7,983,465 B2 | 7/2011 | Leroux et al. | |
| 2007/0217666 A1* | 9/2007 | Gal et al. | 382/131 |
| 2008/0217540 A1* | 9/2008 | Panin et al. | 250/363.03 |
| 2008/0317198 A1* | 12/2008 | Thornton | 378/18 |
| 2009/0164458 A1* | 6/2009 | Jung | G06Q 30/02 |
| 2009/0175562 A1* | 7/2009 | Pan et al. | 382/312 |
| 2010/0014732 A1 | 1/2010 | Vija et al. | |
| 2010/0054394 A1* | 3/2010 | Thibault et al. | 378/8 |
| 2011/0103669 A1* | 5/2011 | Michel et al. | 382/131 |
| 2012/0177274 A1 | 7/2012 | Koehler et al. | |
| 2013/0208963 A1* | 8/2013 | Leal et al. | 382/128 |
| 2014/0111508 A1* | 4/2014 | Bystrov et al. | 345/419 |

OTHER PUBLICATIONS

Ortuno et al., Efficient methodologies for system matrix modelling in iterative image reconstruction for rotating high-resolution, PETPhys. Med. Biol. 55 (2010) pp. 1833-1861.*

(Continued)

*Primary Examiner* — Vu Le
*Assistant Examiner* — Guillermo Rivera-Martinez
(74) *Attorney, Agent, or Firm* — Melissa K. Dobson

(57) ABSTRACT

A computer-implemented method for penalized-likelihood reconstruction of a Positron Emission Tomography (PET) image includes generating a regularization function in which a smoothing parameter is modulated by one or more data-independent spatially variable modulation factors to compensate for sensitivity variations in a PET voxel dataset, and reconstructing the PET image from the PET emission dataset using the regularization function.

15 Claims, 10 Drawing Sheets

(56) References Cited

OTHER PUBLICATIONS

Aguiar et al. Geometrical and Monte Carlo projectors in 3D PET reconstruction, Oct. 2010, Med. Phys. 37 (11), pp. 5691-5702.*
Ahn et al., "Analysis of Resolution and Noise Properties of Nonquadratically Regularized Image Reconstruction Methods for PET", Medical Imaging, IEEE Transactions on, pp. 413-424, vol. 27, Issue 3, Mar. 3, 2008.
Fessler et al., "Spatial Resolution Properties of Penalized-Likelihood Image Reconstruction: Space-Invariant Tomographs" Image Processing, IEEE Transactions on, pp. 1346-1358, vol. 5, Issue 9, Sep. 9, 1996.
Qi et al., "Resolution and Noise Properties of MAP Reconstruction for Fully 3-D PET", Medical Imaging, IEEE Transactions on, pp. 493-506, vol. 19, Issue 5, May 5, 2000.
Stayman., "Spatial Resolution in Penalized-Likelihood Image Reconstruction", A Dissertation Submitted in Partial Fulfillment of the Requirements for the Degree of Electrical Engineering and Computer Science, pp. 1-239, 2003.
Wang et al., "Penalized Likelihood PET Image Reconstruction Using Patch-based Edge-preserving Regularization", Medical Imaging, IEEE Transactions on, pp. 1, vol. PP, Issue 99, Aug. 2, 2012.

\* cited by examiner

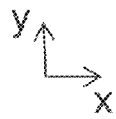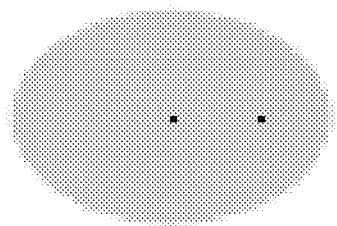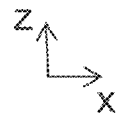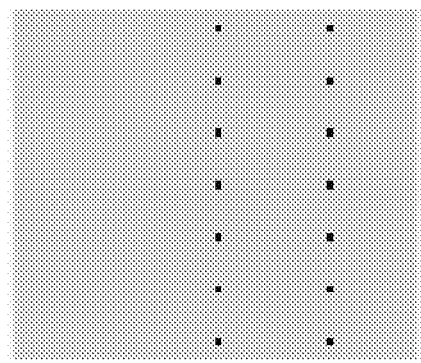
FIG. 3A    FIG. 3B
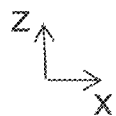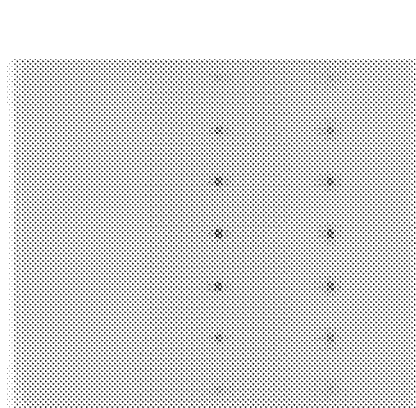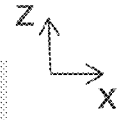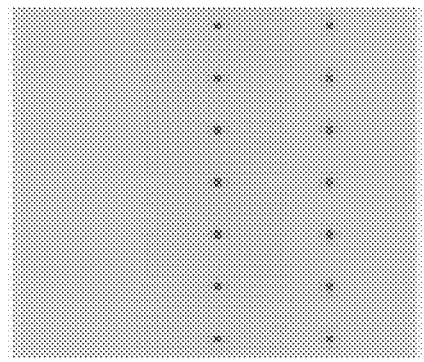
FIG. 3C    FIG. 3D

SYSTEMS AND METHODS FOR PET PENALIZED-LIKELIHOOD IMAGE RECONSTRUCTION WITH SPATIALLY VARYING SMOOTHING PARAMETERS

FIELD

This disclosure relates generally to medical imaging, and more particularly, to systems and methods for reconstructing images from positron emission tomography emission data using spatially varying smoothing parameters.

BACKGROUND

Positron emission tomography (PET) is a medical imaging technique that provides in vivo functional information on physiological processes. In PET, positron-emitting radionuclides on biologically active molecules, such as fluorodeoxyglucose (FDG), are introduced into a patient. A radionuclide in the patient's body decays and emits a positron, which undergoes an annihilation with a nearby electron, subsequently generating a pair of 511 keV gamma ray photons that travel in nearly opposite directions. If a pair of gamma ray photons are detected within a coincidence timing window by two detectors in an array of PET detectors, a coincidence event is recorded for the line of response (LOR). The LOR is a line between the two detectors that have detected the photon pair. Each event is sorted in an array called a sinogram.

PET image reconstruction is used to reconstruct the three-dimensional distribution of the radiotracer in the patient's body from the measured sinogram data. The spatial distribution of the radiotracer is called an activity or emission image, or simply an image, and an estimate of the unknown true image provided by an image reconstruction process is called a reconstructed image.

SUMMARY

In one embodiment, a computer-implemented method for penalized-likelihood reconstruction of a Positron Emission Tomography (PET) image includes generating a regularization function in which a smoothing parameter is modulated by one or more data-independent spatially variable modulation factors to compensate for sensitivity variations in a PET voxel dataset, and reconstructing the PET image from the PET emission dataset using the regularization function.

In some embodiments, the method may include calculating each of the data-independent spatially variable modulation factors as a mean of a first sensitivity factor associated with a first voxel in the PET voxel dataset and a second sensitivity factor associated with a second voxel in the PET voxel dataset, where the first and second voxels neighbor each other. In some embodiments, the mean may include a geometric mean or an arithmetic mean.

In some embodiments, the method may include calculating the first sensitivity factor as a function of a first distance between a center voxel in the PET voxel dataset and the first voxel, and calculating the second sensitivity factor as a function of a second distance between the center voxel and the second voxel. In some embodiments, the first voxel, the second voxel and the center voxel may be in axial relation with each other within or across one or more slices of the PET voxel dataset, and the distance may be calculated with respect to the axial relation. For example, the first sensitivity factor may decrease from a value of 1 as the first distance increases, and the second sensitivity factor may decrease from a value of 1 as the second distance increases. In some other embodiments, the first and second sensitivity factors may each decrease linearly as the first and second distances increase, respectively. In yet other embodiments, the first and second sensitivity factors may each be clipped at a positive, non-zero lower limit.

In some embodiments, the first voxel, the second voxel and the center voxel may be in trans-axial relation with each other within or across one or more slices of the PET voxel dataset, and the distance may be calculated with respect to the trans-axial relation. For example, the first sensitivity factor may increase as the first distance increases, and the second sensitivity factor may increase as the second distance increases.

In some embodiments, the smoothing parameter may include a sensitivity factor associated with a center voxel in the PET voxel dataset.

In one embodiment, a non-transitory computer-readable medium has stored thereon computer-executable instructions that when executed by a computer cause the computer to generate a regularization function in which a smoothing parameter is modulated by a combination of one or more data-independent spatially variable modulation factors to compensate for sensitivity variations in a PET voxel dataset, and reconstruct the PET image from the PET emission dataset using the regularization function.

In some embodiments, the computer readable medium may further include computer-executable instructions that when executed by the computer cause the computer to calculate each of the data-independent variable modulation factors as a mean of a first sensitivity factor associated with a first voxel in the PET voxel dataset and a second sensitivity factor associated with a second voxel in the PET voxel dataset, where the first and second voxels neighbor each other. In some embodiments, the computer readable medium may further include computer-executable instructions that when executed by the computer cause the computer to calculate the first sensitivity factor as a function of a first distance between a center voxel in the PET voxel dataset and the first voxel, and calculate the second sensitivity factor as a function of a second distance between the center voxel and the second voxel.

In one embodiment, a system for penalized-likelihood reconstruction of a Positron Emission Tomography (PET) image includes a processor, an input coupled to the processor and configured to receive a PET emission dataset, and a memory coupled to the processor. The memory includes computer-executable instructions that when executed by the processor cause the processor to generate a regularization function in which a smoothing parameter is modulated by one or more data-independent spatially variable modulation factors to compensate for sensitivity variations in the PET voxel dataset, and reconstruct the PET image from the PET emission dataset using the regularization function.

In some embodiments, the memory may further include computer-executable instructions that when executed by the processor cause the processor to calculate each of the data-independent variable modulation factors as a mean of a first sensitivity factor associated with a first voxel in the PET voxel dataset and a second sensitivity factor associated with a second voxel in the PET voxel dataset, where the first and second voxels neighbor each other. In some embodiments, the memory may further include computer-executable instructions that when executed by the processor cause the processor to calculate the first sensitivity factor as a function of a first distance between a center voxel in the PET voxel dataset and the first voxel, and calculate the second sensitivity factor as a function of a second distance between the center voxel and the second voxel. In some embodiments, the first voxel, the second voxel and the center voxel may be in axial relation with each other within or across one or more slices of the PET voxel dataset. The distance may be calculated with respect to the axial relation. For example, the first sensitivity factor may decrease from a value of 1 as the first distance increases, and the second sensitivity factor may decrease from a value of 1 as the second distance increases. In other embodiments, the first and second sensitivity factors may each linearly decrease as the first and second distances increase, respectively.

In some embodiments, the first voxel, the second voxel and the center voxel may be in trans-axial relation with each other within or across one or more slices of the PET voxel dataset. The distance may be calculated with respect to the trans-axial relation. For example, the first sensitivity factor may increase as the first distance increases, and the second sensitivity factor may increase as the second distance increases.

BRIEF DESCRIPTION OF THE DRAWINGS

Features and aspects of embodiments are described below with reference to the accompanying drawings, in which elements are not necessarily depicted to scale.

FIGS. 3A-3D are exemplary images reconstructed from high SNR data, in accordance with one embodiment.

DETAILED DESCRIPTION

Figure 1A:
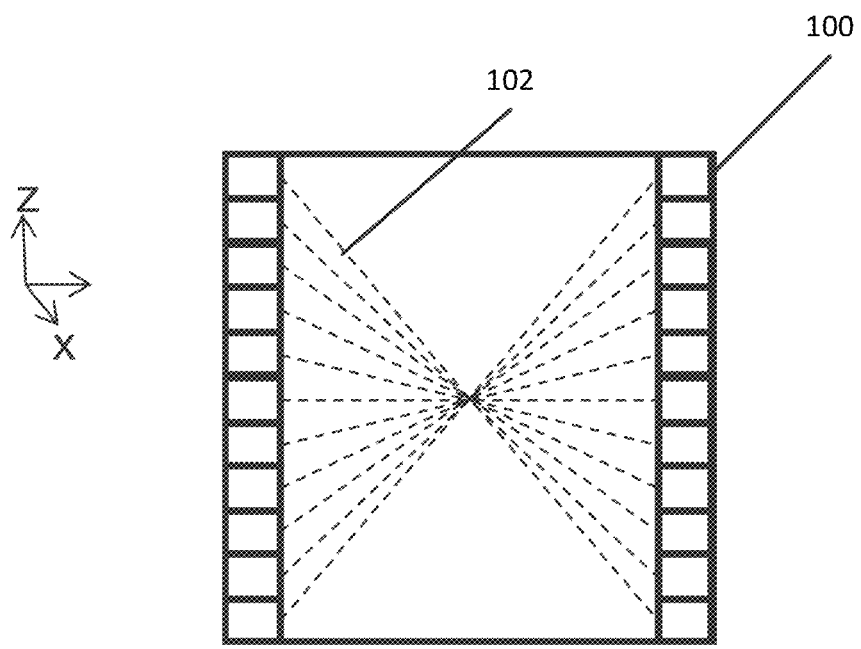
FIGS. 1A and 1B are schematic diagrams depicting exemplary axial sensitivities at different points in a conventional three-dimensional cylindrical PET scanner.

Whereas conventional positron emission tomography (PET) image reconstruction techniques are data-dependent and/or use constant smoothing parameters, exemplary embodiments are directed to reconstructing, from PET emission data, an image that optimizes an objective function using spatially varying smoothing parameters that are independent of the emission data. The emission data may be obtained, for example, using a conventional PET detector. In various embodiments, the smoothing parameters are spatially modulated to compensate for axial and/or trans-axial sensitivity variations in the emission data to achieve a uniform spatial resolution in the reconstructed image. The spatially varying smoothing parameters may, for example, be used with one or more numerical optimization algorithms to produce the reconstructed image. Such numerical algorithms include preconditioned conjugate gradient (PCG), preconditioned gradient ascent, coordinate ascent, block sequential regularized expectation maximization (BSREM), separable paraboloidal surrogates (SPS), De Pierro's modified expectation maximization (EM) and an ordered subset variation of the aforementioned algorithms.

Penalized-likelihood (PL) image reconstruction, also known as maximum a posteriori (MAP) image reconstruction, is a class of image reconstruction methods in which a numerical optimization algorithm is used to determine an image that maximizes a PL objective function and thereby produce a reconstructed image. The PL objective function consists of a likelihood or log-likelihood function, and a regularization function, also known as a penalty function and a prior distribution.

The likelihood function in the PL objective function measures the data fidelity. The likelihood function can be calculated from the Poisson distributions since the sinogram data can be well modeled as independent Poisson random variables. Alternatively, weighted least squares can be used when the data are approximated by Gaussian random variables. In this case, the methods may be reduced to penalized weighted least squares (PWLS), which is a special case of PL.

The regularization function stabilizes noise in reconstructed images by incorporating prior information on the unknown image. A regularization function may penalize the image roughness, which is the difference of neighboring voxel values, and consequently encourage smooth images.

One conventional regularization function has the following form: $R(\lambda)=\beta\Sigma_{j,k} w_{jk} \phi(\lambda_j, \lambda_k)$, where $\lambda$ denotes an image; $\lambda_j$ and $\lambda_k$ represent image values in voxels j and k, respectively; $\beta$ is a smoothing parameter, also known as a hyper-parameter, which controls the strength of the regularization; $w_{jk}$ is a distance factor, which is inversely proportional to the distance between voxels j and k or some power of the distance if voxels j and k are neighbors, and is zero otherwise; and $\phi$ is a penalty function, which is a function of neighboring voxels. Since $w_{jk}$ is zero for voxels j and k that are not neighbors, the regularization function may be rewritten as $R(\lambda)=\beta\Sigma_{j,k:\ voxels\ j\ \&\ k\ are\ neighbors} w_{jk} \phi(\lambda_j, \lambda_k)$.

Examples of the penalty function $\phi$ include a quadratic or Gaussian penalty $\phi(\lambda_j, \lambda_k)=(\lambda_j-\lambda_k)^2$, a generalized Gaussian $\phi(\lambda_j, \lambda_k)=|\lambda_j-\lambda_k|^p$ for $1\leq p\leq 2$, and a relative difference penalty $\phi(\lambda_j, \lambda_k)=(\lambda_j-\lambda_k)^2/(\lambda_j+\lambda_k+\gamma|\lambda_j-\lambda_k|)$ for $\gamma\geq 0$. Other penalty functions, such as Huber and log cosh, may be used. Different penalty functions may result in different image qualities. While the quadratic penalty tends to over-smooth edges in reconstructed images, the generalized Gaussian and the Huber have edge-preserving properties. The relative difference penalty produces activity-dependent smoothing; that is, it produces more smoothing in low-activity background regions and less smoothing in high-activity regions.

Penalized-likelihood image reconstruction with a single smoothing parameter often results in non-uniform spatial resolution over a reconstructed image in clinical PET mainly due to spatially varying sensitivities. In other words, in a reconstructed image, some regions have high spatial resolution and some regions have low resolution. For example, in fully three-dimensional image reconstruction with a single smoothing parameter used, end slices in reconstructed images have lower spatial resolution than central slices. This is because the central slices have higher sensitivity due to more oblique sinograms, while the end slices have lower sensitivity. Highly spatially-varying resolution is undesirable for a radiologist to read PET images. Furthermore, when anatomical images such as CT and MR are used for PET attenuation correction, PET image motion correction and image registration, highly space-variant resolution mismatches between PET and other imaging modalities may generate undesirable artifacts.

Some conventional techniques attempt to spatially modulate the smoothing parameter to achieve uniform spatial resolution properties using an aggregate certainty map, which contains the diagonal elements of the Fisher information matrix. See, for example, Fessler J. A. and Rogers W. L. (1996), "Spatial resolution properties of penalized-likelihood image reconstruction: space-invariant tomographs," IEEE Transactions on Image Processing, vol. 5, pp. 1346-1358. The aggregate certainty map is a function of individual data sets. To calculate the aggregate certainty map, a back-squared projection operation is required, which computes $\Sigma_i (p_{ij})^2(\bullet)$, where $[p_{ij}]$ denotes the forward model mapping the image space into the sinogram data space taking into account attenuation, normalization and detector blurring. The back-squared projection operation uses non-trivial approximations when the forward model is implemented in factored forms, including detector blurring point spread functions. See, for example, Qi J. and Leahy R. M. (2000), "Resolution and noise properties of MAP reconstructions in fully 3D PET," IEEE Transactions on Medical Imaging, vol. 19, pp. 493-506. In addition, for space-variant three-dimensional PET systems, the aggregate certainty map-based methods use pre-computed look-up tables. See, for example, Qi J. and Leahy R. M. (2000), "Resolution and noise properties of MAP reconstructions in fully 3D PET," IEEE Transactions on Medical Imaging, vol. 19, pp. 493-506. Therefore, these conventional techniques are computationally intensive and dependent on the PET data.

Figure 1B:
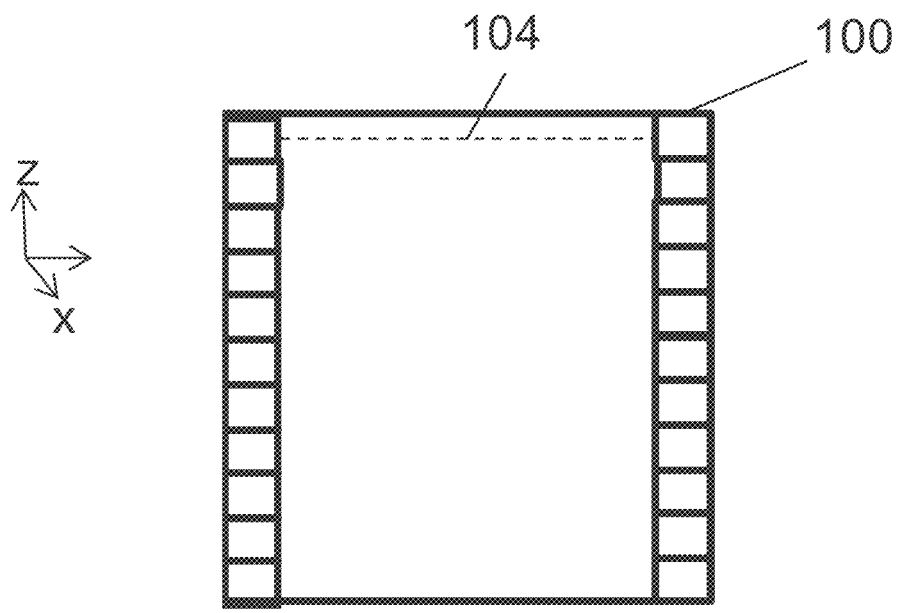

As discussed above, PL image reconstruction with a single (i.e., constant) smoothing parameter produces an image having spatially varying resolution properties due to axial sensitivity variation. FIGS. 1A-B depict exemplary cross sections of a conventional cylindrical PET scanner 100 for illustrating the axial sensitivity variation. FIG. 1A shows one example of the axial sensitivity for a central slice of the axial field of view (FOV), and FIG. 1B shows one example of the axial sensitivity for an end slice of the axial FOV. The dotted lines 102 represent lines of response (LORs) for the central slice, and the dotted lines 104 represent LORs for the end slice. The central slice shown in FIG. 1A has more LORs 102, that is, more oblique sinograms and therefore higher sensitivity, than the end slice shown in FIG. 1B, which has fewer LORs 104, and therefore lower sensitivity.

In addition to the axial sensitivity variation, using a single (i.e., constant) smoothing parameter in each trans-axial slice tends to yield lower spatial resolution in the central region than in peripheral boundary regions due to trans-axial sensitivity variation. This is because photons emitted deep inside the patient body experience more attenuation while traveling in the body, and therefore the central voxels in a trans-axial slice have lower sensitivity than the voxels in peripheral boundary regions.

According to one embodiment, the following regularization function can be used to overcome, among other things, the aforementioned spatial resolution nonuniformity: $R^{new}(\lambda) = \beta \Sigma_{j,k} \alpha_{jk} \tau_{jk} w_{jk} \phi(\lambda_j, \lambda_k)$, where $\alpha_{jk}$ is the axial modulation factor, which modulates axially the smoothing parameter $\beta$, and $\tau_{jk}$ is the trans-axial modulation factor, which modulates trans-axially the smoothing parameter $\beta$. It is possible to modulate the smoothing parameter only axially by setting $\tau_{jk}=1$. It is also possible to modulate the smoothing parameter only trans-axially by setting $\alpha_{jk}=1$. Otherwise, the smoothing parameter can be modulated both axially and trans-axially.

In one embodiment, the axial modulation factor can be defined as $\alpha_{jk} = (\alpha_j \alpha_k)^{1/2}$, where $\alpha_j$ and $\alpha_k$ are the axial sensitivity factors for voxels j and k, respectively. If there are $N_z$ slices, where each slice is numbered from 0 to $N_z-1$, slice $i_{z0}=(N_z-1)/2$ represents the central slice when $N_z$ is an odd number. If $i_z(j)$ denotes the slice number for the slice that voxel j belongs to, the axial sensitivity factor can be defined as:

$$\alpha_j = (1/i_{z0})\{(1/i_{z0})-1\}|i_z(j)-i_{z0}|+1. \quad (1)$$

In equation (1), the axial sensitivity factor has a maximum value of 1 at the central slice when $i_z(j)=i_{z0}$ and decreases to $(1/i_{z0})$ towards the end slices where $i_z(j)$ is zero or $N_z-1$.

Figure 2:
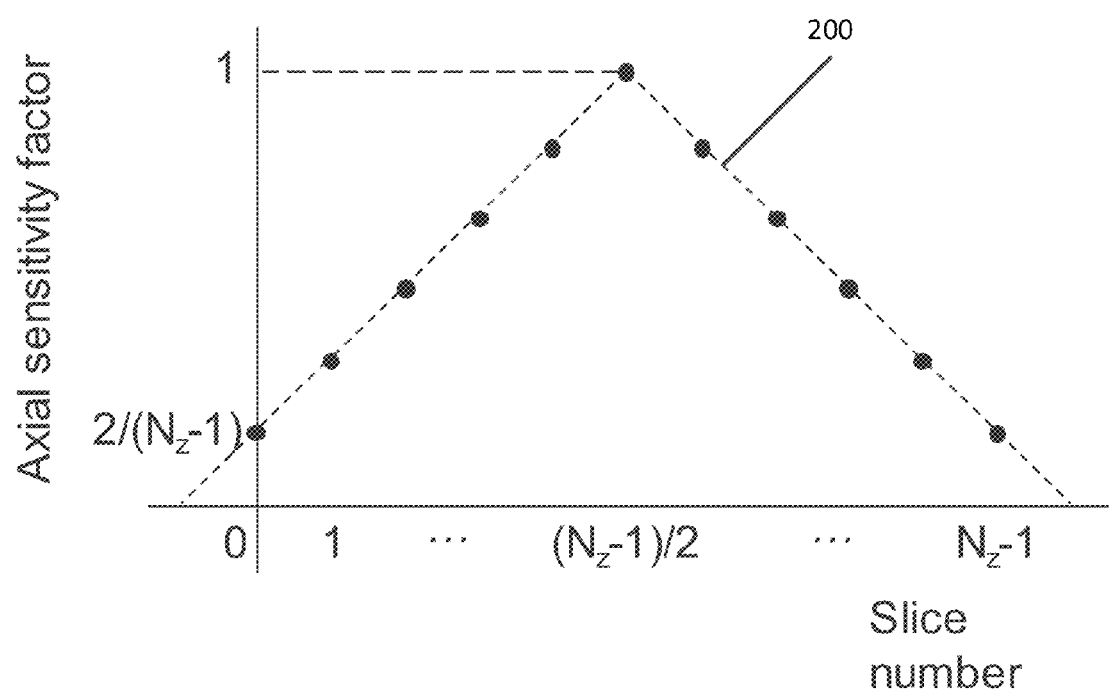
FIG. 2 is a plot of one example of a linearly-decreasing axial sensitivity factor, in accordance with one embodiment.

FIG. 2 depicts a plot of one example of an axial sensitivity factor $\alpha_j$ 200 as a function of the slice number, according to one embodiment. In this example, the smoothing parameter $\beta$ of the regularization function $R^{new}(\lambda)$, when modulated using the axial sensitivity factor $\alpha_j$, is at a maximum in the central slice and decreases linearly towards both end slices. Equation (1) may also be used to obtain the axial sensitivity factor when $N_z$ is an even number.

FIGS. 3A-3D depict exemplary images reconstructed from PL using a single smoothing parameter and axially modulated smoothing parameters obtained from the linearly decreasing axial sensitivity factors given in equation (1). PET data have been generated from a digital phantom. The transverse and the sagittal cross sections of the digital phantom are shown in FIGS. 3A and 3B, respectively. The images have been reconstructed using a quadratic penalty function with a single smoothing parameter (e.g., in FIG. 3C), and axially modulated smoothing parameters (e.g., in FIG. 3D) determined in accordance with one embodiment. While using a single smoothing parameter results in axially varying resolution (FIG. 3C), smoothing parameters axially modulated using the exemplary linearly-decreasing axial sensitivity factors yield improved uniform spatial resolution (FIG. 3D).

In other embodiments, axial sensitivity factors that are different than described by equation (1) can be used. For example, the axial sensitivity factors shown in FIG. 10 of F. H. Fahey, "Data acquisition in PET imaging," Journal of Nuclear Medicine Technology, 30(2), pp. 39-49, 2002, may be used to modulate axially the smoothing parameter, particularly when the maximum ring difference of the three-dimensional PET data is smaller than the maximum allowable one.

Figure 4A:
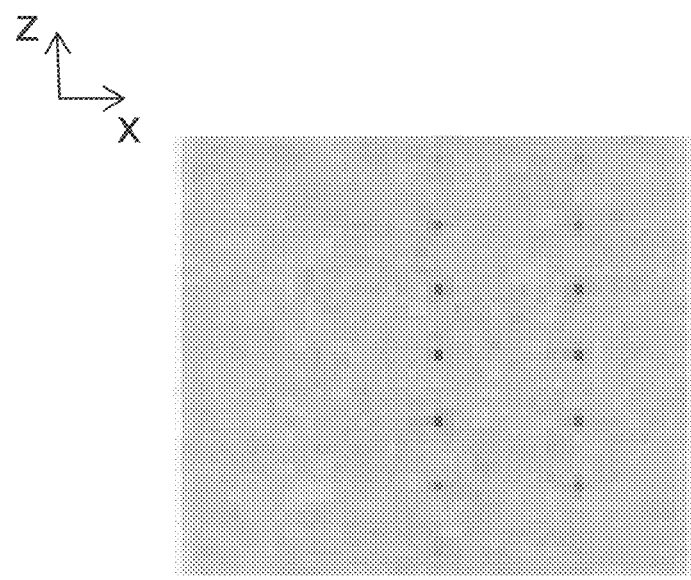
FIGS. 4A and 4B are exemplary images reconstructed from low SNR data, in accordance with one embodiment.
Figure 4B:
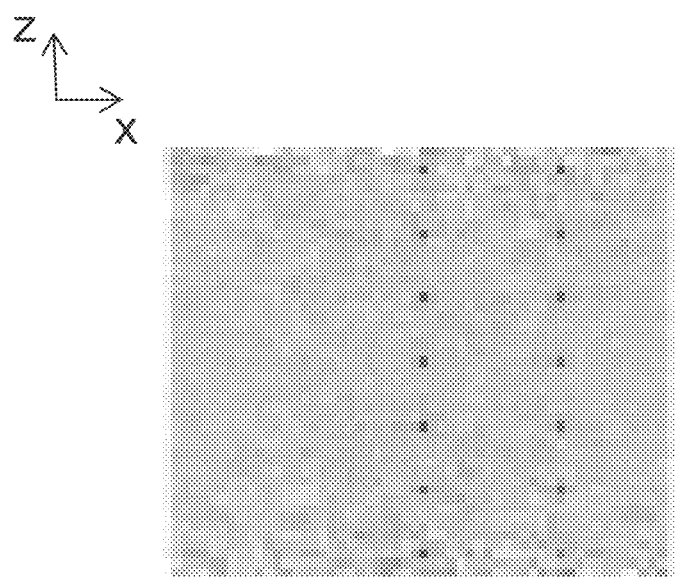
Figure 5:
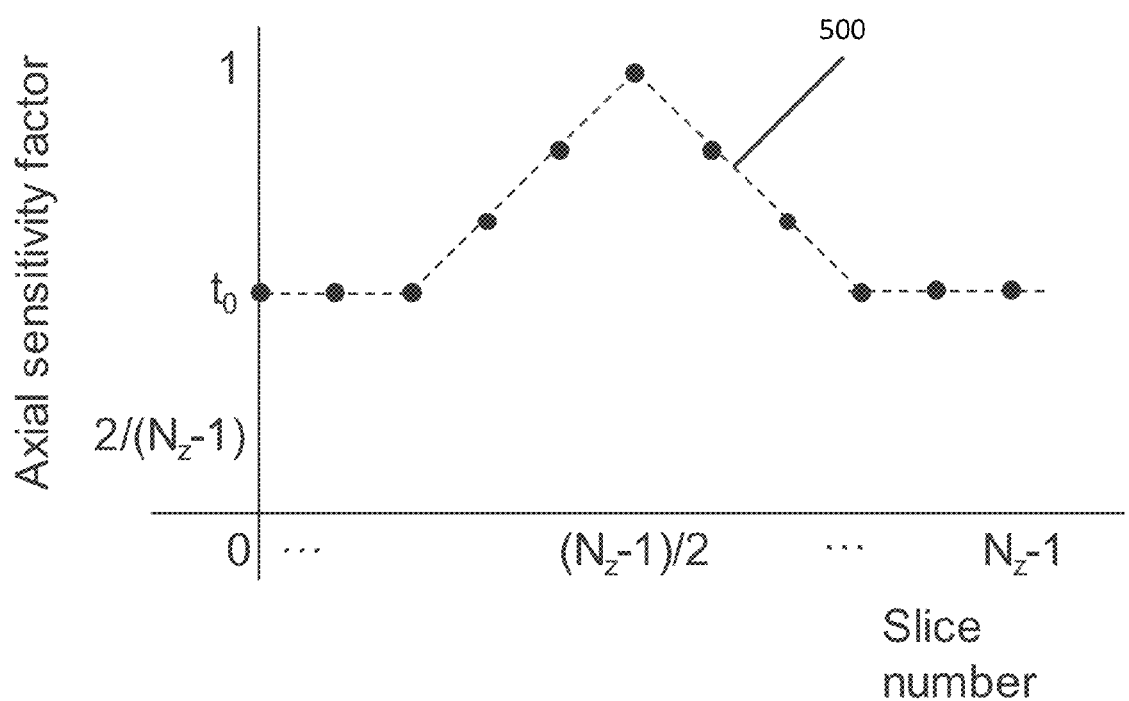
FIG. 5 is a plot of one example of an axial sensitivity factor with clipping, in accordance with one embodiment.

While FIGS. 3C and 3D show images reconstructed from high signal-to-noise ratio (SNR) data, FIGS. 4A and 4B depict exemplary images reconstructed from low SNR data. As shown in FIG. 4A, use of a single smoothing parameter leads to axially non-uniform spatial resolution. As shown in FIG. 4B, axial modulation of the smoothing parameters based on linearly-decreasing axial sensitivity factors, in accordance with one embodiment, yields uniform spatial resolution. However, in FIG. 4B, the end slices show higher noise due to smaller smoothing parameters in end slices as compared to the central slices. To avoid excessive noise amplification in end slices, in another embodiment, an axial sensitivity factor that limits the lower bound by clipping can be defined as:

$$\alpha_j = \min[(1/i_{z0})\{(1/i_{z0})-1\}|i_z(j)-i_{z0}|+1, t_0] \quad (2)$$

where $0 < t_0 < 1$. In this example, the axial sensitivity factor is not allowed to be smaller than $t_0$. FIG. 5 shows a plot of an exemplary axial sensitivity factor 500 with clipping at $t_0$.

If the PET data are acquired over multiple bed positions, some number of end slices may overlap between bed positions. Since the overlapping end slices may be averaged over bed positions, high noise in the end slices as shown in FIG. 4B is less problematic for multiple bed position data acquisition. Therefore, for multiple bed position data acquisition, the threshold $t_0$ in equation (2) may be smaller than for single bed position data acquisition.

Figure 6:
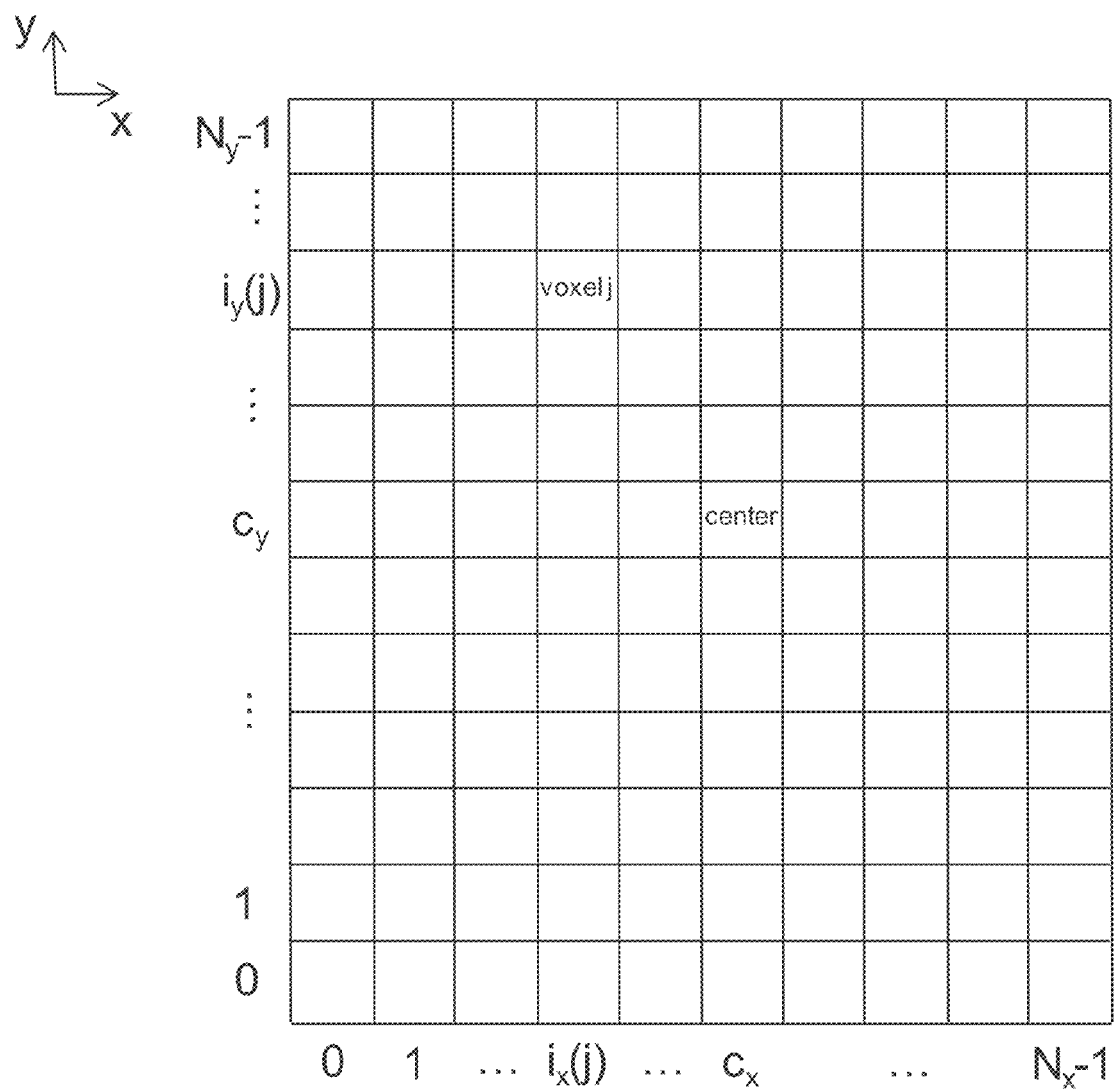
FIG. 6 depicts a two-dimensional x and y coordinate system in a trans-axial slice, in accordance with one embodiment.

In one embodiment, the trans-axial modulation factor can be defined as $\tau_{jk} = (\tau_j \tau_k)^{1/2}$, where $\tau_j$ and $\tau_k$ are the trans-axial sensitivity factors for voxels j and k, respectively. As previously defined, voxel j belongs to trans-axial slice $i_z(j)$. Suppose the trans-axial slice has $N_x$ by $N_y$ voxels, and for each voxel the x-coordinate and the y-coordinate index run from zero to $N_x-1$ and zero to $N_y-1$, respectively. Let $i_x(j)$ and $i_y(j)$ denote the x-coordinate and the y-coordinate index for voxel j, respectively, as depicted in FIG. 6. Let the x- and y-coordinate index of the center voxel be denoted as $(c_x, c_y)$. The trans-axial sensitivity factor $\tau_j$ can be defined as:

$$\tau_j = \delta\{(i_x(j)-c_x)^2 + (i_y(j)-c_y)^2\}^{1/2} \quad (3)$$

for $\delta > 0$. Note $\tau_j$ is the Euclidean distance between the center voxel $(c_x, c_y)$ and voxel j, $(i_x(j), i_y(j))$, multiplied by the scaling factor $\delta$. The parameter $\delta$ may be fixed. Alternatively, $\delta$ may be varied with patient size. That is, for larger patients, larger $\delta$ values may be chosen.

Figure 7A:
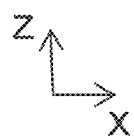
FIGS. 7A-7C are exemplary images reconstructed from PET data, in accordance with one embodiment.
Figure 7A:
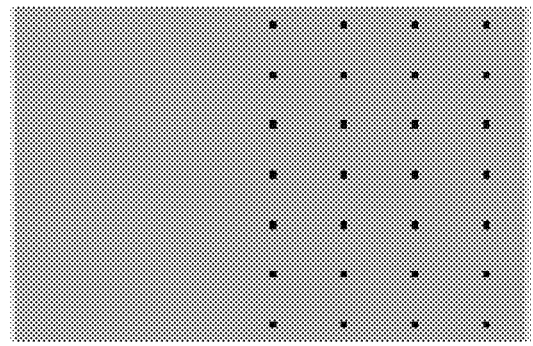
Figure 7B:
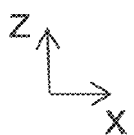
Figure 7B:
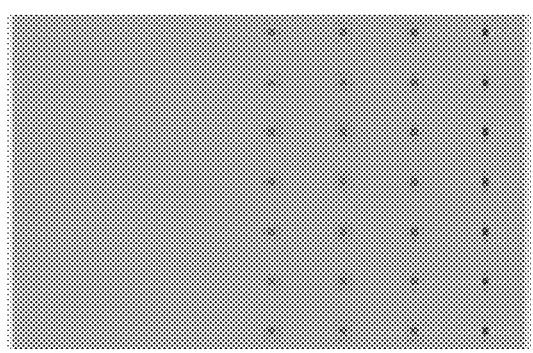
Figure 7C:
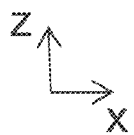
Figure 7C:

FIG. 7A depicts an exemplary digital phantom, from which PET data have been generated. FIG. 7B depicts an exemplary image reconstructed by PL from the PET data with a single smoothing parameter for each trans-axial slice, and FIG. 7B depicts an exemplary image reconstructed by PL from the PET data with trans-axially modulated smoothing parameters, according to one embodiment. While using a single smoothing parameter in each trans-axial slice results in trans-axially varying spatial resolution (e.g., in FIG. 7B), trans-axially modulating smoothing parameters using the trans-axial sensitivity factors given in equation (3) yield uniform spatial resolution (e.g., in FIG. 7C).

The central voxel in a trans-axial slice may be chosen as the center of the field of view or the center of a patient.

In one embodiment, the geometric mean $\alpha_{jk} = (\alpha_j \alpha_k)^{1/2}$ can be used to obtain the axial modulation factors $\alpha_{jk}$ from the axial sensitivity factors $\alpha_j$ and $\alpha_k$. In other embodiments, an arithmetic mean and/or a harmonic mean, or another mean, can be used to obtain the axial modulation factors from the axial sensitivity factors and to obtain the trans-axial modulation factors from the trans-axial sensitivity factors.

In some embodiments, the axial sensitivity factors have a maximum value in the central slice and decrease linearly towards the end slices, as in equation (1). In other embodiments, the axial sensitivity factors become saturated at some slice other than the end slices, as in equation (2). However, other techniques for axially modulating the smoothing parameter, independent of individual data sets, may be employed. In other embodiments, different equations, which use various mathematical functions that approximate the system's sensitivity pattern or the aggregate uncertainty pattern, including polynomials, trigonometric functions, exponential functions and logarithm functions, can be used to decrease the axial sensitivity factor towards the end slices, similar to equation (1) and/or become saturated at some slice, similar to equation (2).

In some embodiments, the trans-axial sensitivity factors are proportional to the Euclidean distance to the central voxel, as in equation (3). However, other techniques for trans-axially modulating the smoothing parameter, independent of individual data set, may be employed. In other embodiments, different equations, which use various mathematical functions that approximate the system's sensitivity pattern or the aggregate certainty pattern, including polynomials, trigonometric functions, exponential functions and logarithm functions, can be used to increase with the distance to the central voxel, similar to equation (3).

As discussed above, in one embodiment, the smoothing parameter can be modulated using separable axial and trans-axial sensitivity factors. In other embodiments, a non-separable function can be designed by using mathematical functions that approximate the system's sensitivity pattern or the aggregate certainty pattern, including polynomials, trigonometric functions, exponential functions and logarithm functions so that the non-separable function has properties that it decreases towards the end slices and/or becomes saturated at some slice and in each trans-axial slice it increases with the distance to the central voxel.

Figure 8A:
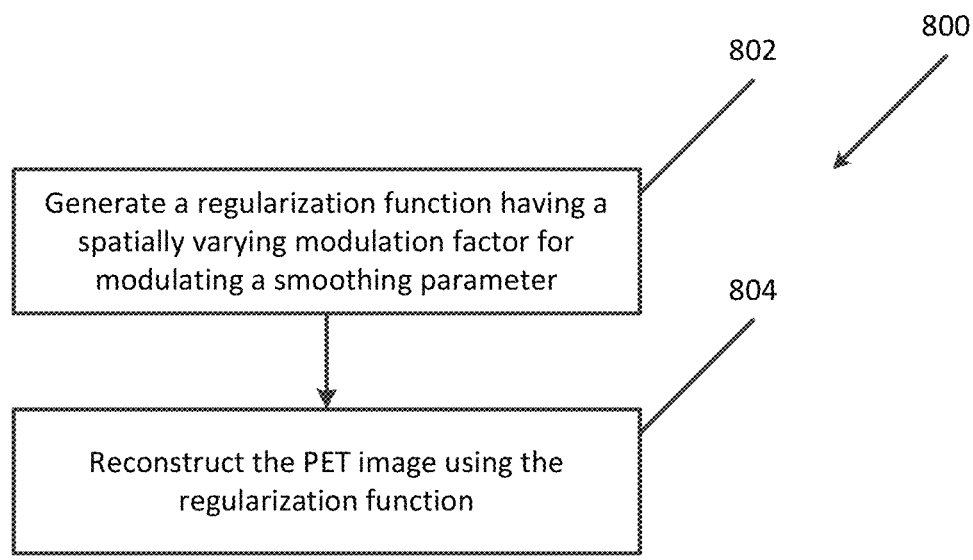
FIG. 8A is a flow diagram of one example of a process of reconstructing a PET image, according to one embodiment.

FIG. 8A is a flow diagram of one example of a process 800 of reconstructing a PET image, according to one embodiment. In FIG. 8A, process 800 includes generating (step 802) a regularization function having a spatially varying modulation factor for modulating a smoothing parameter (e.g., in the regularization function). The regularization function may, for example, be $R^{new}(\lambda) = \beta \Sigma_{j,k} \alpha_{jk} \tau_{jk} w_{jk} \phi(\lambda_j, \lambda_k)$, as described above, with modulation factors $\alpha_{jk}$ and/or $\tau_{jk}$. The process 800 further includes reconstructing (step 804) the PET image using the regularization function generated in step 802, such as described above.

Figure 8B:
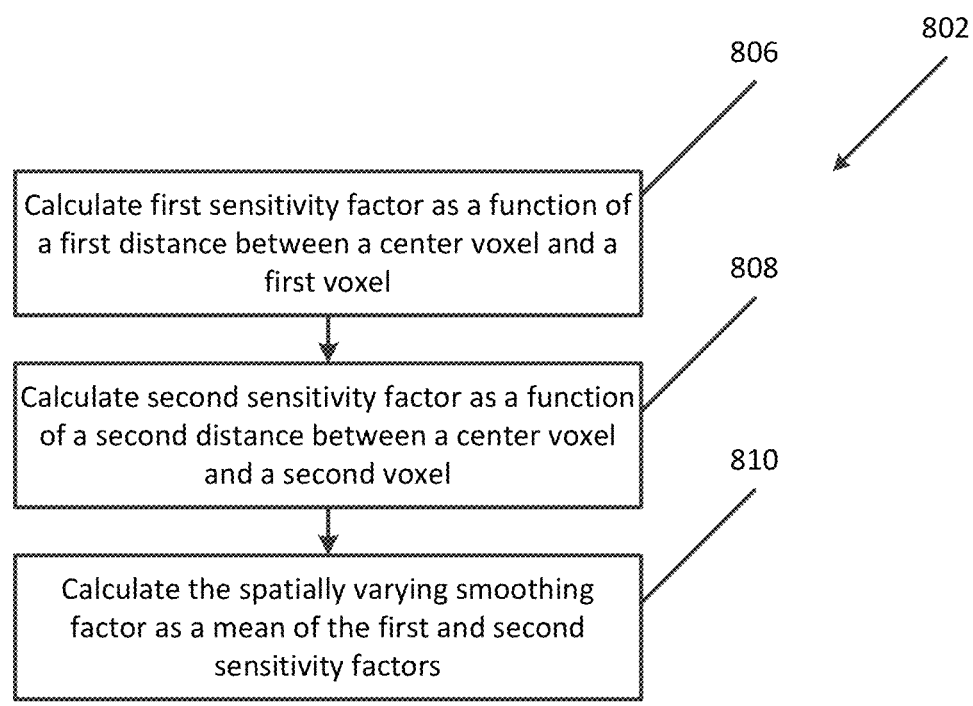
FIG. 8B is a flow diagram of one example of a process of generating a regularization function, according to one embodiment.

FIG. 8B is a flow diagram of step 802 in further detail, according to one embodiment. Step 802 includes calculating (step 806) the first sensitivity factor as a function of a first distance between a center voxel in the PET voxel dataset and the first voxel, and calculating (step 808) the second sensitivity factor as a function of a second distance between the center voxel and the second voxel. As described above, the first and second voxels are any two neighboring voxels in the PET data set. Step 802 further includes calculating (810) the data-independent spatially variable modulation factor as a mean of the first sensitivity factor and the second sensitivity factor. More specifically, because the first and second sensitivity factors are functions of distance between voxels, the spatially variable modulation factor is not dependent on any data in the PET data set. Therefore, the smoothing parameter in the regularization function may be modulated independently of the data, in contrast to conventional aggregate certainty based techniques.

As discussed above, if the voxels (i.e., the first, second and/or center voxels) are in axial relation to each other, in one embodiment, the first and/or second sensitivity factors are a function of the distance between voxels, where the function decreases from a value of, for example, 1, as the distance increases. The function may, for example, provide for a linear or non-linear (e.g., quadratic) decrease in the first and/or second sensitivity factors. In another embodiment, the function can be non-linear such that the sensitivity factor generally, but not strictly, decreases as the distance increases (e.g., 1, 0.9, 0.8, 0.81, 0.7, 0.6, etc.). If the voxels are in trans-axial relation to each other, in another embodiment, the first and/or second sensitivity factors can be a function of the distance between voxels, where the first and/or second sensitivity factors increase as the distance increases. In yet another embodiment, a combination of axial and trans-axial sensitivity factors, such as the axial and trans-axial sensitivity factors described above, can be used to modulate the smoothing parameter of the regularization function.

Figure 9:
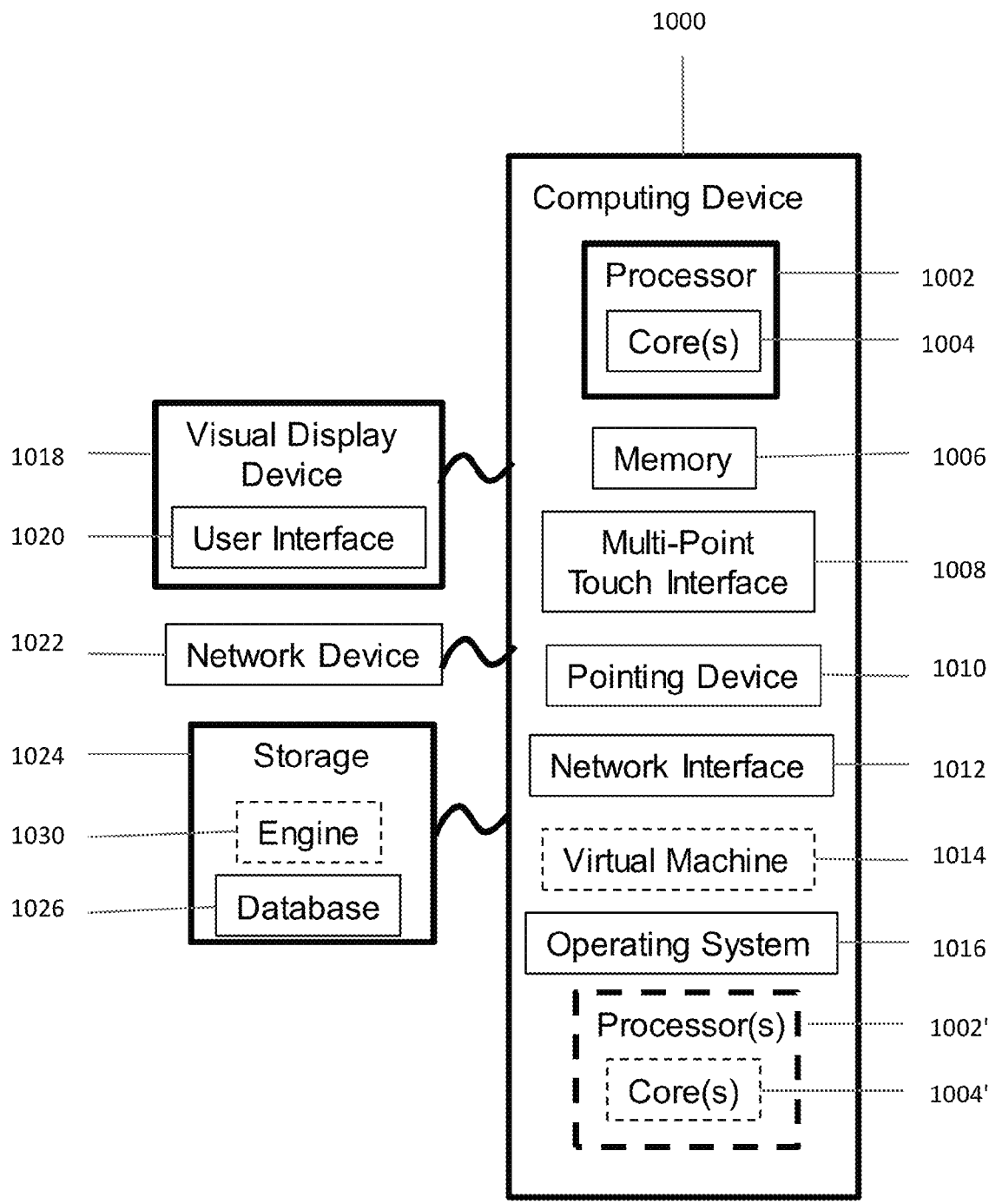
FIG. 9 is a block diagram of one example of a system for carrying out one or more embodiments.

FIG. 9 is a block diagram of an exemplary computing device 1000 that may be used to implement exemplary embodiments described herein. The computing device 1000 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 1006 included in the computing device 1000 may store computer-readable and computer-executable instructions or software for implementing exemplary embodiments, such as process 800 of reconstructing a PET image. The computing device 1000 also includes configurable and/or programmable processor 1002 and associated core 1004, and optionally, one or more additional configurable and/or programmable processor(s) 1002' and associated core(s) 1004' (for example, in the case of computer systems having multiple processors/cores), for executing computer-readable and computer-executable instructions or software stored in the memory 1006 and other programs for controlling system hardware. Processor 1002 and processor(s) 1002' may each be a single core processor or multiple core (1004 and 1004') processor.

Virtualization may be employed in the computing device 1000 so that infrastructure and resources in the computing device may be shared dynamically. A virtual machine 1014 may be provided to handle a process running on multiple processors so that the process appears to be using only one computing resource rather than multiple computing resources. Multiple virtual machines may also be used with one processor.

Memory 1006 may include a computer system memory or random access memory, such as DRAM, SRAM, EDO RAM, and the like. Memory 1006 may include other types of memory as well, or combinations thereof.

A user may interact with the computing device 1000 through a visual display device 1018, such as a computer monitor, which may display one or more user interfaces 1020 that may be provided in accordance with exemplary embodiments. The computing device 1000 may include other I/O devices for receiving input from a user, for example, a keyboard or any suitable multi-point touch interface 1008, a pointing device 1010 (e.g., a mouse). The keyboard 1008 and the pointing device 1010 may be coupled to the visual display device 1018. The computing device 1000 may include other suitable conventional I/O peripherals.

The computing device 1000 may also include one or more storage devices 1024, such as a hard-drive, CD-ROM, or other computer readable media, for storing data and computer-readable instructions and/or software that implement exemplary embodiments described herein. Exemplary storage device 1024 may also store one or more databases for storing any suitable information required to implement exemplary embodiments. For example, exemplary storage device 1024 can store one or more databases 1026 for storing information, such as emission data, PET images, image reconstruction algorithms, smoothing parameters, spatially variable modulation factors and/or any other information. In one embodiment, one or more variable modulation factor profiles (e.g., such as shown in and described with respect to FIGS. 2 and 5) may be pre-calculated and stored in the storage device 1024 for future use. The databases may be updated by manually or automatically at any suitable time to add, delete, and/or update one or more items in the databases. The storage device 1020 can also store an engine 1030 including logic and algorithms for performing one or more of the exemplary methods disclosed herein.

The computing device 1000 can include a network interface 1012 configured to interface via one or more network devices 1022 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1012 may include a built-in network adapter, network interface card, PCMCIA network card, card bus network adapter, wireless network adapter, USB network adapter, modem or any other device suitable for interfacing the computing device 1000 to any type of network capable of communication and performing the operations described herein. Moreover, the computing device 1000 may be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 1000 may run any operating system 1016, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 1016 may be run in native mode or emulated mode. In an exemplary embodiment, the operating system 1016 may be run on one or more cloud machine instances.

Figure 10:
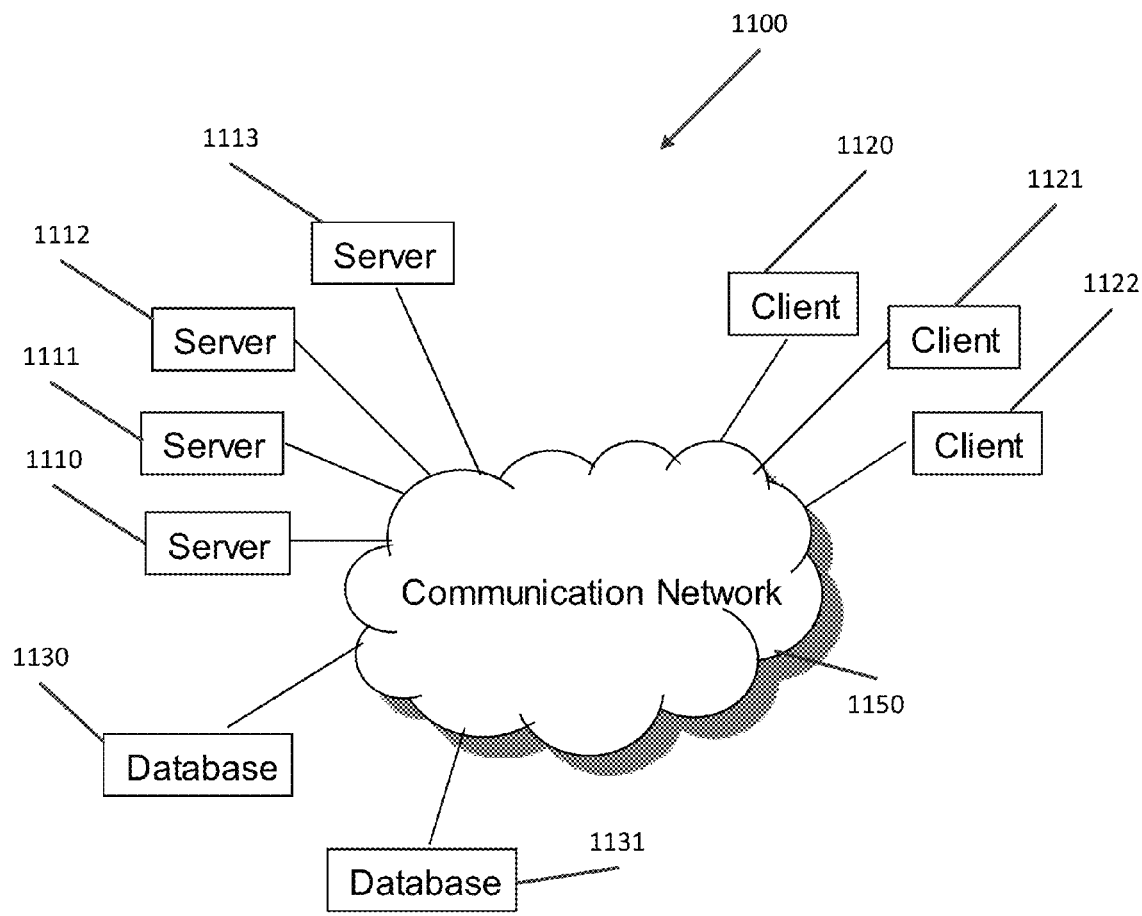
FIG. 10 is a block diagram of an exemplary client-server environment for implementing one or more embodiments.

FIG. 10 is a block diagram of an exemplary client-server environment 1100 configured to implement one or more embodiments disclosed herein. The computing system 1100 includes servers 1110-1113 operatively coupled to clients 1120-1122, via a communication network 1150, which can be any network over which information can be transmitted between devices communicatively coupled to the network. For example, the communication network 1150 can be the Internet, Intranet, virtual private network (VPN), wide area network (WAN), local area network (LAN), and the like. The computing system 1100 can include repositories or database devices 1130, 1131, which can be operatively coupled to the servers 1110-1113, as well as to clients 1120-1122, via the communications network 1150. The servers 1110-1113, clients 1120-1122, and database devices 1130, 1131 can be implemented as computing devices. Those skilled in the art will recognize that the database devices 1130, 1131 can be incorporated into one or more of the servers 1110-1113 such that one or more of the servers can include databases.

In some embodiments, the engine 1030 of FIG. 9 can be implemented by a single device, such as the server 1110. In some embodiments, the engine 1030 can be distributed among different devices (e.g., servers, clients, databases) in the communication network 1150 such that one or more components of the engine 1030, or portions thereof, can be implemented by different devices in the communication network 1150. In exemplary embodiments, the databases 1130, 1131 can store emission data, PET images, image reconstruction algorithms, smoothing parameters, spatially variable modulation factors and/or any other information.

Having thus described several exemplary embodiments of the invention, it is to be appreciated various alterations, modifications, and improvements will readily occur to those skilled in the art. For example, some embodiments can be applied to time-of-flight (TOF) PET data and non-TOF PET data; list-mode PET data and sinogram PET data; gated PET data and dynamic PET data; and penalized-likelihood (PL) and penalized weighted least squares (PWLS). Accordingly, the foregoing description and drawings are by way of example only.

What is claimed is:

1. A computer-implemented method for penalized-likelihood reconstruction of a Positron Emission Tomography (PET) image, the PET image comprising one or more image voxel values, each of which is indexed by an x-coordinate and y-coordinate index, the computer including a processor, the method comprising:
   generating, by the processor, a regularization function, the regularization function comprising a penalty function as a function of voxels neighboring the one or more image voxel values, a smoothing parameter resulting in non-uniform spatial resolution over a reconstructed PET image due to spatially varying sensitivities, the smoothing parameter controlling strength of the regularization function, and one or more modulation factors modulating the smoothing parameter, the modulation factors independent of the one or more image voxel values and one or more PET emission datasets, and spatially variable to compensate for the spatially varying sensitivities in the x-coordinate and y-coordinate index;
   reconstructing, by the processor, the PET image from the PET emission dataset using the regularization function; and
   calculating, by the processor, each of the modulation factors as a mean of a first sensitivity factor associated with a first voxel in the PET voxel dataset and a second sensitivity factor associated with a second voxel in the PET voxel dataset.

2. The computer-implemented method of claim 1, further comprising:
   calculating, by the processor, the first sensitivity factor as a function of a first distance between a center voxel in the PET voxel dataset and the first voxel; and
   calculating, by the processor, the second sensitivity factor as a function of a second distance between the center voxel and the second voxel.

3. The computer-implemented method of claim 2:
   wherein the first voxel, the second voxel and the center voxel are in axial relation with each other within or across one or more slices of the PET voxel dataset;
   wherein the distance is calculated with respect to the axial relation;
   wherein the first sensitivity factor decreases from a value of 1 as the first distance increases; and
   wherein the second sensitivity factor decreases from a value of 1 as the second distance increases.

4. The computer-implemented method of claim 3, wherein the first and second sensitivity factors each decrease linearly as the first and second distances increase, respectively.

5. The computer-implemented method of claim 4, wherein the first and second sensitivity factors are each clipped at a positive, non-zero lower limit.

6. The computer-implemented method of claim 2:
   wherein the first voxel, the second voxel and the center voxel are in trans-axial relation with each other within or across one or more slices of the PET voxel dataset;
   wherein the distance is calculated with respect to the trans-axial relation;
   wherein the first sensitivity factor increases as the first distance increases; and
   wherein the second sensitivity factor increases as the second distance increases.

7. The computer-implemented method of claim 1, wherein the smoothing parameter includes a sensitivity factor associated with a center voxel in the PET voxel dataset.

8. A non-transitory computer-readable medium having stored thereon computer-executable instructions that when executed by a computer cause the computer to:
   generate, by the processor, a regularization function, the regularization function comprising a penalty function as a function of voxels neighboring the one or more image voxel values, a smoothing parameter spatially-invariant and controlling strength of the regularization function, and a modulation factor independent of the one or more image voxel values and a PET emission dataset, wherein the modulation factor modulates the smoothing parameter and wherein the modulation factor is spatially variable to compensate for sensitivity variations in an x-coordinate and y-coordinate index of the voxel values
   reconstruct the PET image from the PET emission dataset using the regularization function; and
   calculate each of the modulation factors as a mean of a first sensitivity factor associated with a first voxel in the PET voxel dataset and a second sensitivity factor associated with a second voxel in the PET voxel dataset;
   wherein the mean includes a geometric mean or an arithmetic mean, alone or in combination, used to obtain axial modulation factors from axial sensitivity factors and to obtain trans-axial modulation factors from trans-axial sensitivity factors.

9. The computer readable medium of claim 8, further comprising computer-executable instructions that when executed by the computer cause the computer to:
   calculate the first sensitivity factor as a function of a first distance between a center voxel in the PET voxel dataset and the first voxel; and
   calculate the second sensitivity factor as a function of a second distance between the center voxel and the second voxel.

10. A system for penalized-likelihood reconstruction of a Positron Emission Tomography (PET) image, the system comprising:
    a processor;
    an input coupled to the processor and configured to receive a PET voxel dataset; and
    a memory coupled to the processor, the memory including computer-executable instructions that when executed by the processor cause the processor to:

generate a regularization function, the regularization function comprising a penalty function as a function of the voxels neighboring the one or more image voxel values, a smoothing parameter resulting in non-uniform spatial resolution over a reconstructed PET image due to spatially varying sensitivities, the smoothing parameter controlling strength of the regularization function, and one or more modulation factors modulating the smoothing parameter, the modulation factors independent of the one or more image voxel values and one or more PET emission datasets, and spatially variable to compensate for spatially varying sensitivities;

reconstruct the PET image from the PET emission dataset using the regularization function and calculate each of the modulation factors as a mean of a first sensitivity factor associated with a first voxel in the PET voxel dataset and a second sensitivity factor associated with a second voxel in the PET voxel dataset;

wherein the mean includes a geometric mean or an arithmetic mean, alone or in combination, used to obtain axial modulation factors from axial sensitivity factors and to obtain trans-axial modulation factors from trans-axial sensitivity factors.

11. The system of claim 10, wherein the memory further includes computer-executable instructions that when executed by the processor cause the processor to:

calculate the first sensitivity factor as a function of a first distance between a center voxel in the PET voxel dataset and the first voxel; and calculate the second sensitivity factor as a function of a second distance between the center voxel and the second voxel.

12. The system of claim 11:

wherein the first voxel, the second voxel and the center voxel are in axial relation with each other within or across one or more slices of the PET voxel dataset;

wherein the distance is calculated with respect to the axial relation;

wherein the first sensitivity factor decreases from a value of 1 as the first distance increases; and wherein the second sensitivity factor decreases from a value of 1 as the second distance increases.

13. The system of claim 12, wherein the first and second sensitivity factors each linearly decrease as the first and second distances increase, respectively.

14. The system of claim 11:

wherein the first voxel, the second voxel and the center voxel are in trans-axial relation with each other within or across one or more slices of the PET voxel dataset;

wherein the distance is calculated with respect to the trans-axial relation;

wherein the first sensitivity factor increases as the first distance increases; and wherein the second sensitivity factor increases as the second distance increases.

15. The system of 10, wherein the smoothing parameter includes a sensitivity factor associated with a center voxel of the PET voxel dataset.

* * * * *